Figure 1:
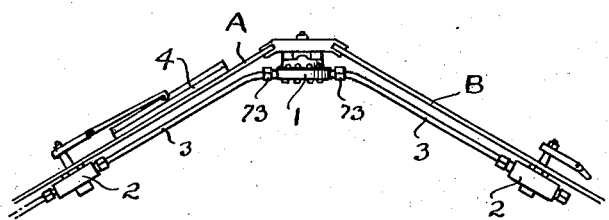

Jan. 15, 1946.  C. R. SACCHINI  2,393,193
MOTION CONVERTER MECHANISM
Filed Oct. 29, 1942   2 Sheets-Sheet 1

INVENTOR
COLUMBUS R. SACCHINI
BY
George M. Soule
ATTORNEY

Jan. 15, 1946.   C. R. SACCHINI   2,393,193
MOTION CONVERTER MECHANISM
Filed Oct. 29, 1942   2 Sheets-Sheet 2
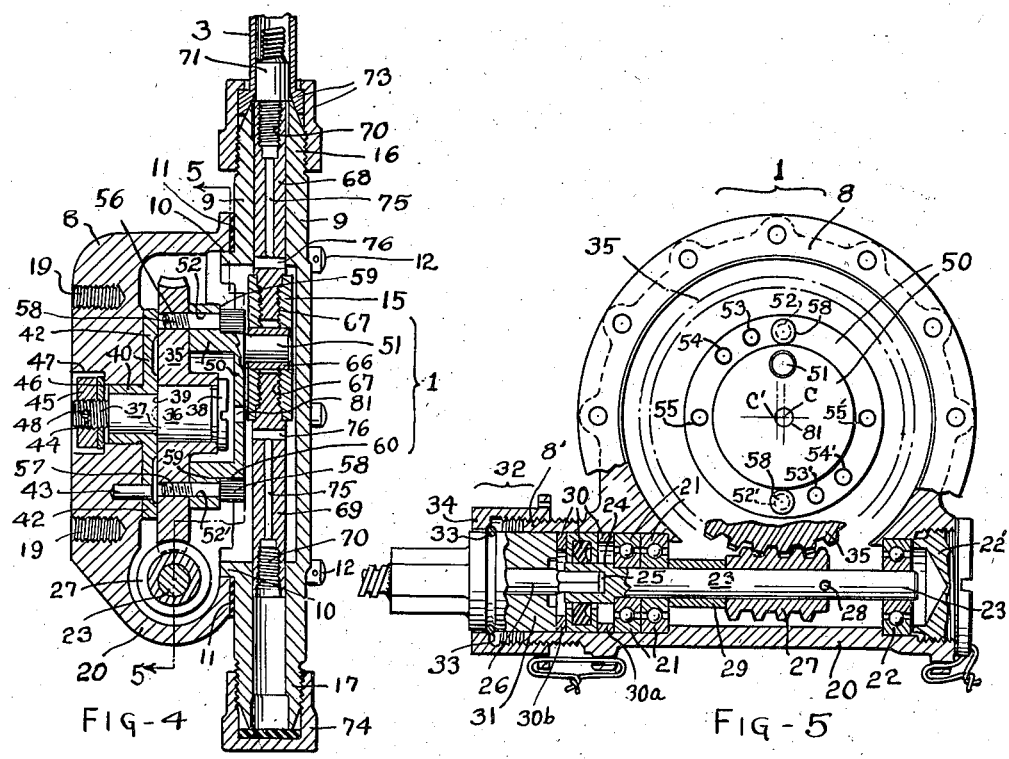
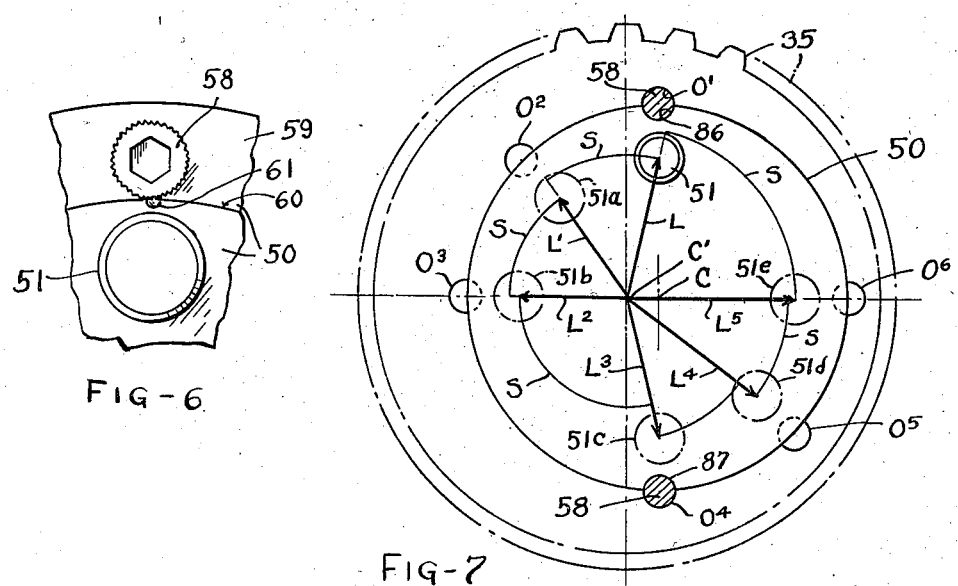
INVENTOR
COLUMBUS R. SACCHINI
BY George M. Soule
ATTORNEY Patented Jan. 15, 1946

2,393,193

UNITED STATES PATENT OFFICE 2,393,193

MOTION CONVERTER MECHANISM

Columbus R. Sacchini, Euclid, Ohio, assignor to The Marquette Metal Products Company, Cleveland, Ohio, a corporation of Ohio Application October 29, 1942, Serial No. 463,747

11 Claims. (Cl. 74—50)

The general object of this invention is to provide certain improvements in or relating to motion converter mechanism units, usable, for example, to drive window and windshield wiper mechanisms on aircraft and other vehicles. A more specific object is to provide a simple, efficient, sturdy and compact mechanism for converting rotary motion into reciprocating motion, as, for example, in order to actuate one or more window wiping units through the intermediary of flexible push-pull shafting.

A further object is to provide a motion converter mechanism for windshield wiper mechanisms and analogous uses, wherein one or more power take-off connections for drive shafting of a subsidiary unit or plurality of such units can extend at practically any desired angle or angles (in at least one plane) with reference to a single mounted position of the converter mechanism and/or wherein a driving motor or driving shaft driven by the converter mechanism can have the same degree of angular adjustment adaptability with reference to the power take-off connection or connections when the latter must or should occupy some fixed or special position or positions on a supporting structure.

Another important object is to provide a novel means in a motion converter unit of the type shown, for enabling the effective length of strokes on part of an ultimate driven element (e. g. wiper blade) to be adjusted.

Other objects include the provision of a unit for purposes such as indicated above which unit: (a) can be made economically entirely or nearly entirely from non-magnetic and generally light weight materials so that the unit, regardless of its position on (e. g.) an aircraft, will have practically no effect on the compass of the ship, and will not materially reduce pay loading; (b) will operate properly for long periods of time—as on long flights—without likelihood of requiring any attention or repair; (c) can easily be adjusted to obtain a relatively large number of different length strokes of a reciprocating driving (power take-off) element for associated units (e. g. window units with individual wiper arm mechanism); (d) is not subject to becoming "oil locked" by reason of trapped lubricant; and (e) in which the essential working parts can be easily and quickly assembled and maintained in proper free working relationships.

Figure 2:
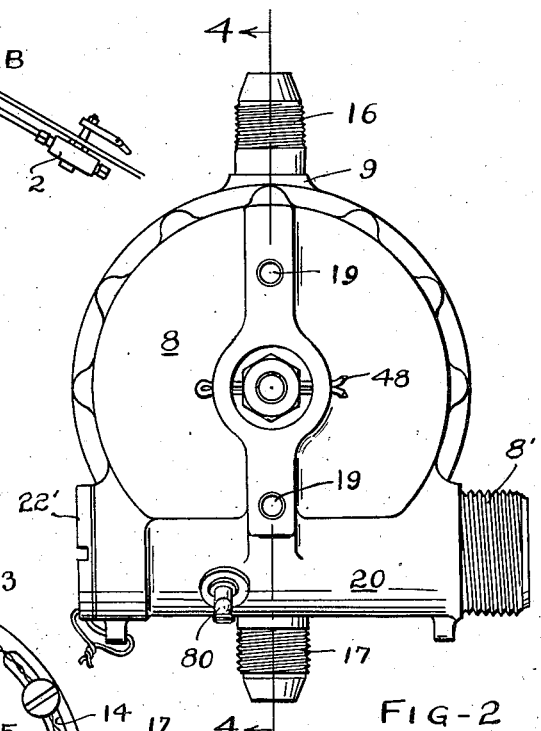
Figure 3:
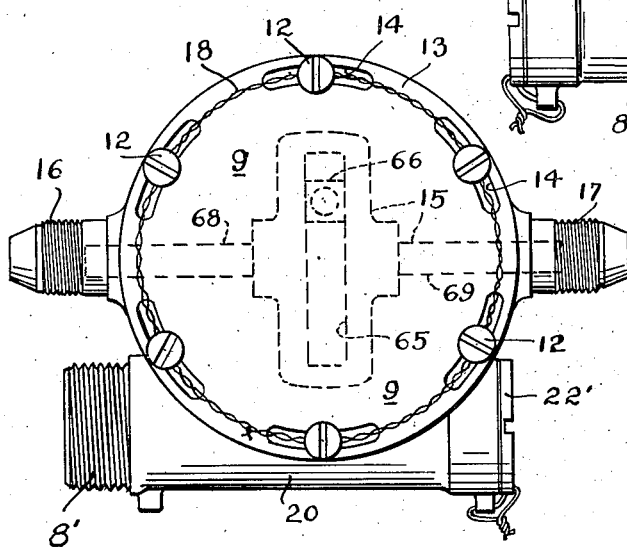

Other objects and features will become apparent from the following description of a preferred form shown in the drawings, wherein:

Fig. 1 is a more or less diagrammatic small scale plan view showing one relative position of the converter unit hereof to two driven (window) units and a typical airplane windshield structure; Figs. 2 and 3 are rear and front views respectively of the converter unit, the latter figure showing a power take-off head adjusted at right angles to the position in which the head is shown on the other figures; Fig. 4 is a sectional view taken substantially along the plane indicated at 4—4, Fig. 2; Fig. 5 is a sectional elevational view taken generally as indicated at 5—5 on Fig. 4; Fig. 6 is a fragmentary relatively enlarged detail view of a preferred mounting attachment of an adjustable circular drive or adapter plate carrying a crank or throw pin of a scotch yoke; and Fig. 7 is an assembly diagram showing schematically the theory of operation in adjusting the drive or adapter plate for obtaining strokes of different amplitude on part of the scotch yoke.

Referring to Fig. 1, showing typical relatively convergent positions of two airplane windshield panels A and B (viewed edgewise), one convenient mounting position for the converter unit 1 hereof is between these panels, as indicated, so that two or more window units 2 (wiper arm driving mechanism) can be driven from the converter 1 as through flexible push and pull shafting in tubular casings 3. The window units 2 can be motion converters of well known form operative as by a rack and pinion to change the reciprocating motions of the respective flexible shafts into alternate rotary or oscillating motion for actuating the wiper blades 4 in contact with the respective windshield panels. The principal problems encountered in connection with installations on the order of that indicated by Fig. 1 are sufficiently well known in the art so as not to require detailed discussion here. Many problems are presented by variation in ship construction, it being obviously desirable to make the mechanism as a whole as universally adaptable to the different constructions as possible. Considerable effective and positive power is required at the wiper blades; and, both from the standpoint of minimizing weight and enabling clear vision as well as from the standpoint of non-interference with other essential apparatus, the equipment must be relatively small and compact. The direction of relative extent of ingoing and outgoing shafting, on different jobs, may vary nearly through 360°. Electric motors, if used, must be of small size, capable of fairly high speed and placed as nearly out of the way as possible. The above are merely illustrative problem factors such as had to be taken into consideration in the development represented by the present invention.

The casing or housing of the unit 1 may comprise a generally hollow body (e. g. an aluminum casting) 8 complemented by a head body member 9 (e. g. same class of casting) which latter is secured to the body 8 at a pilot type joint 10 including a gasket 11, by appropriate cap type screws 12. The screws have heads operatively abutting the outer face of a circular flange 13 of the head and pass through arcuately elongated slots 14 in the flange. The main purpose of the head 9 is to support a slotted crosshead (scotch yoke) 15 (later described more in detail) which crosshead imparts motion to take-off shafts connected to threaded extensions 16 and 17 respectively diametrally of the head. The slots 14 enable the head 9 to be turned turret-wise through substantial angles upon loosening of the screws 12; and the head is centered with relation to the driving mechanism contained by the body 8, described later, so that the yoke functions properly in all possible turned positions of the head on the main body. Two illustrated positions of the extensions 16 and 17 are illustrated (cf. Figs. 2 and 3), it being necessary, of course, to remove the screws in order to turn the head beyond the limits afforded by the arcuate slots. When properly positioned and secured, the head 13 may be locked by a tie or sealing wire 18 inserted through holes in all the screw heads, as suggested in Fig. 3.

Provision for mounting the converter unit onto the vehicle may be bolts, screws or studs (not shown), which pass through the frame work of the window or windshield from threaded openings 19 on the body 8—Figs. 2 and 4.

A tubular lower portion 20 of the body 8 (see Fig. 5) is counterbored from opposite ends slidably to receive antifriction bearing assemblies 21 and 22 for supporting a drive shaft 23. An enlarged end portion 24 of the shaft has a noncircular socket 25 adapted to receive a complementary terminal part of a generally flexible torque shaft 26, Fig. 5, or a similar part of a motor drive shaft not shown. The enlarged socketed portion 24 of the shaft 23 can move to abut one of the bearing assemblies 21; a worm 27 is pinned to the shaft as at 28, and a spacer sleeve 29 lies between the other bearing 21 and the worm. A seal assembly 30, including metal rings or washers 30a and 30b around the enlarged shaft portion 24 is axially rigid and abuts a pilot sleeve portion 31 of a connecter device 32 of the flexible torque shaft; and the sleeve 31 may be secured in the connecter assembly by a snap ring 33. The outer threaded collar 34 of the connecter, in which the snap ring is seated, is threaded to an extension 8' of the body 8 and can turn on the pilot sleeve 31 in the manner of a pipe union nut.

The bearing assembly 22 at the opposite end of the shaft 23 floats or may float axially on the shaft and is held in the housing by a threaded cap 22' against excessive axial movement. Thus the worm is held accurately in position by the inner race members of the twin bearing assemblies 21 and the associated sleeves and spacers so that no very close axial manufacturing limits have to be maintained in order to ensure free rotation of the shaft. The openings for the pin 28 which secures the worm on the shaft 23 are, of course, sufficiently accurately located to prevent excessive end play on part of the shaft. The entire assembly constituted by the shaft 23, the worm, sleeve 29, the bearings 21, the seal parts including the two spacer rings 30a and 30b can slide into place in the housing portion 20 (from left to right), but when the connecter is in place and the collar 34 is screwed on tightly against the snap ring, said assembly is then incapable of movement except that the worm shaft still has axial working clearance and is free to turn.

The worm 27 is in constant mesh with a worm wheel or gear 35 which turns freely on an enlarged portion 36 of a bearing and supporting pin 37 (Fig. 4) having a head portion 38 adjacent the hub of the worm gear and a shoulder at 39 abutting a combined thrust plate and bearing member 40 (flanged sleeve). The sleeve surrounds the pin 37 and is snugly seated in a circular bore of the housing 8. The flanged sleeve 40 is of wear resisting but non-magnetic metal and the flange 42 is in sliding contact with the outer portions of the worm gear which otherwise would tend to wear the main body casting. The flange 42 may be held in position against turning by a dowel 43, Fig. 4.

Beyond the end of the flanged sleeve 40, in a direction away from the worm gear, the pin 37 is threaded at 44 for a retaining nut 45 which bears inwardly on the housing toward the worm against a thrust washer 46. The nut and thrust washer lie wholly within a suitable cavity 47 in the housing body 8; and the nut and pin can be prevented from turning by means of a cotter pin 48 inserted through a hub portion of the body 8, the nut and the threaded portion of the pin, as clearly shown by Figs. 2 and 4. By maintaining adequate limits between the shoulder formed by the head 38 of the pin 37 and the shoulder 39 of said pin, the worm gear can always turn freely on the pin regardless of how tight the retaining nut 45 is clamped against the washer 46 in holding the pin 37 and the flanged sleeve 40 firmly in position.

For connecting the worm gear to the slotted crosshead 15 of the scotch yoke mechanism, I provide a cup-shaped crank pin supporting plate 50 (hereinafter crank plate) which plate may be secured in any one of a series of turned positions on the worm gear such that a driving or crank pin 51, rigidly carried by the plate (e. g. integral) lies various distances from the center of rotation of the worm gear. Thereby, the movement of the crosshead can be adjusted in order to amplify or reduce the working area or areas of the wiper blades. Additional variations can be obtained by using different sized rack-driven pinions in the window units 2.

For the purposes outlined above, the crank plate 50 has a circularly arranged series of paired threaded holes, the elements of which pairs lie generally on opposite sides of the axis of rotation as shown in Fig. 5; but the axes of the threaded holes lie on a circle which is slightly eccentric to the worm gear axis. Four pairs of such threaded holes 52—52', 53—53', 54—54' and 55—55' are shown for illustrative purposes. The worm gear 35 has one pair of holes 56 and 57 positioned to match all pairs 52—52' etc. Said pair of holes 56 and 57 are threaded to receive attaching screws 58, which screws pass through the selected (nonthreaded) holes in the crank plate and clamp the crank plate tightly to the worm gear. The heads of the screws 58 abut a shoulder or step 59 on the crank plate, and serrated or fluted peripheral portions of the screw heads lie directly adjacent a reduced cylindrical surface 60 of the plate, which surface is adjacent the step mentioned. When the crank plate is secured in the position to afford the desired crank throw, the screws are staked in position by prick punch indentations, such as shown at 61, Fig. 6; and the staking, thus accomplished, forces the metal of the crank plate outwardly in a manner to occupy spaces between adjacent teeth afforded by the serrated or fluted screw heads.

The plate is hollowed on its rear face around the gear hub and supporting pin 37, clearing the same a considerable distance on all sides, to enable lateral crank-adjusting movement of the crank plate.

The center of the crank plate (C, Fig. 5) is offset a slight distance with reference to the center of rotation C' of the worm gear; and, by turning the ring into positions different from that which the ring occupies as shown, namely, so that the attaching screws enter other pairs of holes 53—53', 54—54' etc., seven different crank throw distances are possible. The operation is more clearly demonstrated by the diagram Fig. 7, wherein the eccentric relationship of the crank plate and the worm gear is emphasized, and the series of paired holes (corresponding to 52—52' etc.) are assumed to be in the worm wheel or gear 35, as an alternative construction, rather than in the crank plate. The two arrangements are operatively the same except that, in event of placing the holes 52—52' etc. in the worm gear, then more thread tapping operations are necessary. In the diagram, only three pairs of holes corresponding to the holes 52—52' etc. are indicated.

In Fig. 7, the crank plate 50 is indicated by a mutilated circle, and two screw receiving (non-threaded) holes 86 and 87 of said plate by circular indentations in said circle. The crank pin 51 is diagrammatically indicated in six positions, namely, 51, 51a, 51b, etc. to 51e. The threaded holes in the worm gear for receiving the attaching screws are serially numbered $O^1$ to $O^6$. With the crank plate secured as by insertion of the screws in the holes $O^1$ and $O^4$ (crank position 51) the effective crank arm length is as indicated at L. When the plate is turned counterclockwise so that the screws occupy the next adjacent pair of holes $O^2$, $O^5$ (position 51a) a shorter crank arm $L^1$ is afforded and, when turned to position 51b, a still shorter arm $L^2$ is afforded. The next position, 51c, results in obtaining the same effective lever-arm length as L (length $L^3$); but, when the plate is further turned from that position counterclockwise, the next two positions 51d and 51e result in successively longer crank arm lengths $L^4$ and $L^5$. Thus, with three circumferentially spaced pairs of screw-receiving holes in the worm gear (or the same arrangement of holes on the crank plate, viz: according to the construction shown by Figs. 4 and 5) five different crank positions (and crosshead movements) are possible, and the number can be increased progressively by providing more screw positions as in Fig. 5 (four pairs, seven crank pin positions). The increments of change obtainable are further made apparent by the arcs S scribed about the center of the worm gear.

In actual practice the crank plate 50 and worm gear 35 would have match marks corresponding to a table furnished the assembler or serviceman, to aid in correctly positioning the crank plate for the desired length of reciprocation of the crosshead.

The crank pin 51 extends into the throat slot 65 of the crosshead 15 and preferably bears thereon through the intermediary of a generally rectangular bearing block 66 (Figs. 3 and 4) to avoid wear on the pin and slot. The crosshead is threaded on opposite sides as at 67 to receive the inner ends of yoke rods 68 and 69 which ends occupy smooth guide bores in the extensions 16 and 17 of the turret head 9. Said yoke rods have threaded sockets 70 at their ends for engagement with similarly threaded terminal portions 71 (Fig. 4 only, one shown at top) of the flexible push and pull window unit drive shafts. The casings 3 of the drive shafts may be secured to the threaded extensions 16 and 17 as by union couplings 73 of suitable design.

Sometimes the crosshead drives only one flexible shaft, in which case the unoccupied extension 16 and 17 is provided with a threaded sealing cap such as shown at the bottom of Fig. 4 at 74. The yoke rods 68 and 69 are centrally bored from end to end as at 75 and provided with communicating cross holes 76 near the inner ends of the yoke rods. The holes 75 and 76 afford venting of the space at the end of a particular rod which might be closed by the cap so that there is no possibility of "oil-locking" of the yoke rod in the cul-de-sac resulting beyond the outer end of the rod within the extension to which the cap is secured. The lateral vent holes 75 are useful also in providing openings to receive a capstan type wrench bar for initially securing the yoke rods into the aligned threaded openings of the crosshead.

As previously mentioned, the central relationship of the turret head portion 9 of the housing and the driving mechanism, referring particularly to the worm gear 35, enables the scotch yoke mechanism properly to operate the flexible push and pull shafting in any adjusted position of the turret head on the main housing or body 8. The reciprocation adjustment afforded by the crank throw lengthening or shortening adjustment of the crank plate on the worm gear, in other words, is unaffected by turning of the turret head housing portion to different positions.

It will be apparent that the crosshead 15 including the yoke rods 68 and 69 (assuming the worm gearing is driven at constant speed), has a true harmonic motion, thereby enabling the wiper drive arms of the window units 2 to be oscillated with simple harmonic motion as through the rack and gear mechanisms of the units 2. Thus even though the wiper arms are required to perform as many as two hundred oscillations per minute under sufficient pressure to clear away sleet and frost and with adequate power to enable the arms to keep moving under adverse conditions (e. g. high slip stream) and the drive is positive throughout the entire mechanism (no yielding connections to absorb shock) the operation is smooth and without destructive jerks. All parts which might have a tendency to become loosened by vibration of the supporting structure are either positively locked or may easily be provided with wires for effective locking, as indicated on the drawings and partially described above.

As far as possible all the materials are or can be non-magnetic metal—e. g. for the machined parts subject to hard wear and strain: stainless steel, Monel, phosphor bronze, beryllium copper, etc., and, in case of the castings, light metals such as aluminum or magnesium alloys.

The spaces around the worm and worm gear are preferably supplied with suitable lubricant as through a grease nipple 80, Fig. 2, near the worm. The lubricant can get to the crank pin; yoke rods and other parts in a manner which will be apparent from the drawings. Preferably an oil hole 81 is provided at the center of the crank plate, and oil passages (not shown) are formed by undercutting the reduced worm gear-contacting faces of the flange 42 of the sleeve 40 around the worm supporting pin 37 for reception of lubricant into contact with the worm gear mounting surfaces which require lubrication.

In airplane cockpits, both of commercial and military types, the available room for mounting the converter unit is often very slight, and it is, of course, desirable that the unit project only a small distance outwardly normal to the surface on which the unit is mounted. Attention is called to the compactness of the present mechanism in the direction of extent of the worm gear axis notwithstanding the provision for adjustment for crank throw in respect to the scotch yoke and the rigid deflection-resisting manner in which the crank pin is supported from the worm gear mounting. The cup shape of the crank-pin-carrying plate 50 enables the gear support and hub to extend within the crank plate a considerable distance close to the plane of operation of the crank pin; and deflection on part of the worm-gear-supporting pin 37 is adequately resisted by the reduced outer annular bearing surfaces of the flanged sleeve 40 which support the worm gear outwardly from the maximum radially outward crank throw position of the crank pin.

I claim:

1. A motion converter mechanism comprising a main housing adapted to be mounted in a fixed operating position, a rotary driving member in the housing, a scotch yoke mechanism having a slotted crosshead connected to the rotary member for reciprocation thereby, a guide for the crosshead including guide members extending in opposite directions from the crosshead, means slidably receiving the guide members, and means operable to attach the previously last named means to the main housing selectively in a plurality of angularly adjusted positions about the axis of the rotary driving member.

2. In a motion converter mechanism, a main housing section, gearing in the housing section including a main driven gear carrying a crank pin, a complementary housing cover section parallel to the principal plane of the gear and detachable from the main housing section to enable insertion of the gear, a scotch yoke crosshead slidable in the complementary housing cover section and operatively connected to the crank pin, said cover section having a turret mounting on the main section adjustable about the axis of the gear as a center in order to turn the working axis of the crosshead in various directions.

3. In a motion converter of the class described, a main housing section having a drive gear therein, a hollow cover plate section parallel to the gear and having oppositely extending guideways therein at right angles to the axis of the gear, a scotch yoke crosshead connected to a crank pin driven by the gear and having aligned power delivery rods occupying the guideways, and fastening means for the cover plate section, said fastening means including a plurality of arcuate slots about a common center and fasteners extending therethrough into the main housing section, said means enabling the rods to extend in various relatively turned positions about said center.

4. A motion converter comprising, in combination, a two part housing which parts complement each other to form substantially a complete hollow inclosure, one part having supporting journals for a worm shaft and for a worm gear in mesh with a worm on the shaft, and the complementary part forming a cover plate for an opening in the first mentioned part through which opening the worm gear can be inserted and secured in mesh with the worm while the cover plate is still unattached, a scotch yoke slotted crosshead slidably mounted in the cover plate, and a crank pin on the worm gear operatively engaging the slot of the crosshead.

5. In a motion converter comprising a housing, a worm and worm gear reduction mechanism therein and a reciprocating mechanism driven by the worm gear, a tubular threaded extension on the housing for attachment of an external drive shaft to the converter and having a counterbore coaxial with the worm, a collar threaded on the extension and having an internal shoulder, mounting means for an external drive shaft, said mounting means being in abutment with the shoulder and piloted in the counterbore of the extension, a worm-supporting shaft to which the worm is fixedly secured, a bearing and seal assembly for the worm shaft with axially rigid mutually abutting parts surrounding the axis of the shaft and lying in said counterbore with the shoulder of the counterbore abutting an end element of said assembly, means on the threaded collar for forcing said piloted portion of the shaft mounting means against the opposite end of said assembly when the threaded collar is turned in one direction on the extension, and means arranged drivingly to connect the worm shaft with such external drive shaft.

6. The arrangement according to claim 5 wherein the outer end of the worm shaft has a shoulder in abutment, inwardly toward the worm, with an axially rigid portion of said bearing and seal assembly and the worm shaft is operatively arranged in opposite abutment relationship with said assembly to prevent outward movement of the worm shaft.

7. In a motion converter of the class described and including a driving worm and shaft and a worm gear meshing with the worm, a housing containing the gearing and counterbored from opposite ends around the worm shaft, bearings in respective counterbores for the worm shaft including an anti-friction bearing assembly against an inner race member of which the shaft is in operative axial abutment outwardly from the worm toward said assembly, a shoulder on an outer end portion of the shaft arranged for limiting abutment with the assembly inwardly toward the worm, and a mounting for an external drive shaft detachably associated with the housing around the worm shaft axis and including a part piloted into the adjacent counterbore and operatively in tight abutment with an outer race member of the bearing assembly.

8. The arrangement according to claim 7 wherein an axially non-compressible seal assembly surrounds the enlarged portion of the worm shaft and constitutes an element of the operative abutment between the pilot part of the external shaft mounting and said outer bearing race.

9. In a motion converter of the class described, a generally closed casing adapted to contain lubricant, reduction gearing in the casing including a rotary part having a crank pin, a crosshead in driven relationship to the crank pin and having oppositely extending power delivery rod portions, bearing bores in the casing into which the rod portions extend, the outer end of said bores being arranged interchangeably to receive closure caps and shaft coupling supports for connection with the rods, said rod portions having axial bores extending from their outer ends and open at all times into the interior of the casing at the inner end portions of the respective bearing bores for the rods.

10. The arrangement according to claim 9 wherein the rod portions of the crosshead are pins of circular cross section threaded into a central portion of the crosshead, and the connection between the open axial bores of the pins and the interior of the casing are cross holes in the pins operable to receive a capstan wrench bar.

11. The improvement in windshield wiper window unit driving means, comprising a housing, mechanism in the housing operative to convert rotary motion into reciprocating motion, said mechanism including a main driving gearing and a reciprocating part driven by said gearing, and turret means constituting a removable cover section of the housing guiding and supporting the reciprocating part and enabling adjustment of the reciprocating part relative to the gearing through an angle of at least 90° and other intermediate angles about an axis extending transverse to the direction of reciprocation.

COLUMBUS R. SACCHINI.